United States Patent
Fuji et al.

(10) Patent No.: US 9,285,275 B2
(45) Date of Patent: Mar. 15, 2016

(54) APPARATUS AND METHOD FOR MEASURING THE INTENSITY AND PHASE OF A LIGHT PULSE

(71) Applicant: INTER-UNIVERSITY RESEARCH INSTITUTE CORPORATION NATIONAL INSTITUTES OF NATURAL SCIENCES, Mitaka-shi, Tokyo (JP)

(72) Inventors: Takao Fuji, Okazaki (JP); Yutaka Nomura, Okazaki (JP)

(73) Assignee: INTER-UNIVERSITY RESEARCH INSTITUTE CORPORATION NATIONAL INSTITUTES OF NATURAL SCIENCES, Tokyo (JP)

(*) Notice: Subject to any disclaimer, the term of this patent is extended or adjusted under 35 U.S.C. 154(b) by 0 days.

(21) Appl. No.: 14/396,978

(22) PCT Filed: Apr. 23, 2013

(86) PCT No.: PCT/JP2013/002735
§ 371 (c)(1),
(2) Date: Oct. 24, 2014

(87) PCT Pub. No.: WO2013/161282
PCT Pub. Date: Oct. 31, 2013

(65) Prior Publication Data
US 2015/0109620 A1  Apr. 23, 2015

(30) Foreign Application Priority Data

Apr. 26, 2012 (JP) .................... 2012-101276

(51) Int. Cl.
*G01J 3/45* (2006.01)
*G01J 11/00* (2006.01)
*G01J 9/00* (2006.01)
*G01J 3/28* (2006.01)
*G01J 9/02* (2006.01)

(52) U.S. Cl.
CPC .............. *G01J 11/00* (2013.01); *G01J 3/2823* (2013.01); *G01J 9/00* (2013.01); *G01J 9/02* (2013.01); *G01J 3/45* (2013.01); *G01J 9/0246* (2013.01)

(58) Field of Classification Search
CPC ............. G01J 9/02; G01J 9/0246; G01J 3/45; G01J 11/00
See application file for complete search history.

(56) References Cited

U.S. PATENT DOCUMENTS 4,921,335 A * 5/1990 Ditman, Jr. .................... 359/241
5,530,544 A * 6/1996 Trebino et al. ................ 356/450

(Continued)

FOREIGN PATENT DOCUMENTS

JP  A-2000-514549   10/2000

OTHER PUBLICATIONS

Takao Fuji, "Generation of 12 fs deep-ultraviolet pulses by four-wave mixing through filamentation in neon gas", Jul. 24, 2007.*
Wu et al., "Free-Space Electro-Optic Sampling of Terahertz Beams," *Appl Phys Lett*, 1995, vol. 67, No. 24, pp. 3523-3525.
Cundiff, "Phase Stabilization of Ultrashort Optical Pulses," *Journal of Physics D: Applied Physics*, 2002, vol. 35, pp. R43-R59.
Fuji et al., "Frequency-Resolved Optical Gating with Electro-Optic Sampling," *EPJ Web of Conferences*, 2013, vol. 41, pp. 1-3.
International Search Report issued in International Application No. PCT/JP2013/002735 mailed Aug. 6, 2013.

(Continued)

*Primary Examiner* — Kara E Geisel
*Assistant Examiner* — Maurice Smith
(74) *Attorney, Agent, or Firm* — Oliff PLC (57) ABSTRACT

Provided are a method and an apparatus for measuring the spectral intensity and phase of a light pulse having an arbitrary time duration. The apparatus includes: a nonlinear mixing means for generating a signal light pulse expressed by the following Formula (★ denotes an operator representing general nonlinear mixing, and α denotes a coefficient which is proportional to a nonlinear susceptibility in the nonlinear mixing) by nonlinearly mixing a reference light pulse having an electric field $E_r(t-\tau)$ delayed by an optical delay means and a measurement target light pulse having an electric field $E_0(t)$; and $$E_r(t-\tau) + \alpha E_r(t-\tau) \star E_0(t)$$

an imaging spectrum device for spectrally splitting the signal light pulse and outputting a Fourier transform signal expressed by the following Formula (F denotes a symbol indicating Fourier transform, * denotes a complex conjugate, and R denotes a symbol indicating a real part), $$|F[E_r(t-\tau)]|^2 + |\alpha F[E_r(t-\tau) \star E_0(t)]|^2 + 2R\{\alpha F[E_r(t-\tau)]^* \cdot F[E_r(t-\tau) \star E_0(t)]\}.$$

8 Claims, 4 Drawing Sheets

(56) References Cited

U.S. PATENT DOCUMENTS

| | | | |
|---|---|---|---|
| 5,754,292 | A | 5/1998 | Kane et al. |
| 5,952,818 | A | 9/1999 | Zhang et al. |
| 2005/0219543 | A1* | 10/2005 | Uehara et al. .................. 356/450 |
| 2006/0056468 | A1* | 3/2006 | Dantus et al. ................... 372/28 |
| 2006/0119855 | A1* | 6/2006 | Li ................................ 356/450 |
| 2011/0149281 | A1* | 6/2011 | Ellis et al. ..................... 356/330 |

OTHER PUBLICATIONS

Dec. 16, 2015 Search Report issued in European Patent Application No. 137811063.

Stibenz, et, al. "Interferometric Frequency-Resolved Optical Gating". Optics Express, vol. 13, No. 1, pp. 2617-2626, Apr. 4, 2005.

* cited by examiner

APPARATUS AND METHOD FOR MEASURING THE INTENSITY AND PHASE OF A LIGHT PULSE

TECHNICAL FIELD

The present invention relates to an apparatus and method for measuring the spectral intensity and phase of a light pulse having an arbitrary time duration.

BACKGROUND ART

In case of a light pulse having a pulse time duration which is equal to or longer than a picosecond, an electric field amplitude waveform can be directly measured by using an oscilloscope. However, if the pulse time duration is shorter than a picosecond, the electric field amplitude waveform cannot be measured by using the oscilloscope.

In an autocorrelator, an ultrashort light pulse is split into two equal pulses. The two pulses are simultaneously input to a nonlinear crystal, and second harmonic wave light is generated. An intensity of the second harmonic wave light is measured as a function of a delay time between the two pulses. This leads to intensity correlation. However, in this intensity correlation method, the phase of the light pulse cannot be obtained.

As a method of measuring the spectral intensity and the spectral phase of an ultrashort light pulse, an electro-optical sampling (EOS) method has been known (refer to, for example, Non-Patent Document 1). In the EOS method, a measurement target pulse having an electric field $E_0(t)$ and a probe light pulse having a time-delay-controlled electric field $E_r(t-\tau)$ are input to an electro-optical (EO) crystal, and a polarization rotation amount of the probe light pulse according to birefringence induced in the EO crystal by the measurement target pulse having the electric field $E_0(t)$ is measured. Namely, the EOS method is a method of measuring interference between the probe light pulse having $E_r(t-\tau)$ and modulation light having $E_r(t-\tau) E_0(t)$ modulated by the measurement target pulse having $E_0(t)$.

In addition, recently, a frequency resolved optical gate (FROG) method for measuring the spectral intensity and phase of an ultrashort light pulse has been developed (refer to, for example, Patent Document 1). In the FROG method, a measurement target pulse having an electric field $E_0(t)$ and a reference light pulse having a time-delay-controlled electric field $E_r(t-\tau)$ are input to a nonlinear medium to generate an induced diffraction grating in the nonlinear medium. The measurement target light $E_0(t)$ input to the nonlinear medium is diffracted by the reference light $E_r(t-\tau)$, and the diffracted pulse light is spectrally split by a spectroscopic device, so that the intensity and the phase of the measurement target light are obtained.

CITATION LIST

Patent Document

[Patent Document 1] U.S. Pat. No. 5,754,292

Non-Patent Document

[Non-Patent Document 1] Q. Wu, X. C. Zhang, "Free-space electrooptic sampling of terahertz beams", Appl. Phys. Lett. Vol. 67, pp. 3523-3525 (1995)

SUMMARY OF INVENTION

Problem to be Solved

In the above-described EOS method in the related art, if an light pulse having a period which is sufficiently shorter than a central frequency of the measurement target pulse is used as probe light, all information (spectral intensity and spectral phase) on the electric field $E_0(t)$ of the measurement target pulse can be obtained. An absolute value of the spectral phase can also be obtained. However, for this reason, since a light pulse having a period which is sufficiently shorter than the central frequency of the measurement target pulse needs to be used as probe light, in the case where the measurement target pulse is an ultrashort light pulse, electric field information cannot be obtained.

On the other hand, in the FROG method, even in the case where the time duration of the reference light pulse is longer than that of the measurement target pulse, the spectral intensity and the spectral phase can be obtained. However, the obtained spectral phase is a relative value, and an absolute value of a carrier envelope phase (CEP) cannot be obtained (refer to S. T. Cundiff, "Phase stabilization of ultrashort optical pulses" J. Phys. D35, pp 43-59 (2002)).

The present invention is contrived by taking into consideration the above-described problems, and an object of the present invention is to provide an apparatus and a method for measuring absolute values of the spectral intensity and phase of a light pulse having an arbitrary time duration.

Means for Solving the Problems

The FROG method and the EOS method have their own advantages and disadvantages. Therefore, the inventors contrived a method of combining the FROG method and the EOS method.

In order to solve the above-described problems, according to an aspect of the present invention, there is provided an apparatus for measuring the intensity and phase of a light pulse being characterized in that it includes: an optical delay means for changing a time delay $\tau$ between a measurement target light pulse having an electric field $E_0(t)$ changing with a time t and a reference light pulse having an electric field $E_r(t)$; a nonlinear mixing means for generating a signal light pulse expressed by the following Formula (★ denotes an operator representing general nonlinear mixing, and a denotes a coefficient which is proportional to a nonlinear susceptibility in the nonlinear mixing) by nonlinearly mixing the reference light pulse having an electric field $E_r(t-\tau)$ delayed by the optical delay means and the measurement target light pulse; and $$E_r(t-\tau) + \alpha E_r(t-\tau) \star E_0(t)$$

an imaging spectrum device for spectrally splitting the signal light pulse and outputting a Fourier transform signal expressed by the following Formula (F denotes a symbol indicating Fourier transform, * denotes a complex conjugate, and R denotes a symbol indicating a real part), $$|F[E_r(t-\tau)]|^2 + |\alpha F[E_r(t-\tau) \star E_0(t)]|^2 + 2R\{\alpha F[E_r(t-\tau)]^* \cdot F[E_r(t-\tau) \star E_0(t)]\} \quad (1)$$

wherein the intensity and phase of the measurement target light pulse are obtained from a signal (frequency resolved optical gate signal) of the second term of the Fourier transform signal and a signal (electro-optical sampling signal) of the third term of the Fourier transform signal.

By allowing the phase obtained from the FROG signal to be coincident with the phase obtained from the EOS signal, an absolute value of the phase can be obtained. It is possible to measure the intensity and the phase of the light pulse having an arbitrary time duration.

In the apparatus for measuring the intensity and the phase of the light pulse, the nonlinear mixing means may include a 4-optical-wave difference frequency mixing means, a 3-optical-wave difference frequency mixing means, or a sum frequency mixing means.

In addition, the 4-optical-wave difference frequency mixing means may be configured by arranging a nonlinear optical gas and a nonlinear optical crystal in cascade.

In addition, the sum frequency mixing means may include a combing means for combing sum frequency mixing light and the reference optical pulse.

In order to solve the above-described problems, according to another aspect of the present invention, there is provided a method for measuring the intensity and phase of a light pulse being characterized in that it includes: an optical delay step of changing a time delay $\tau$ between a measurement target light pulse having an electric field $E_0(t)$ changing with a time t and a reference light pulse having an electric field $E_r(t)$; a nonlinear mixing step of generating a signal light pulse expressed by the following Formula by nonlinearly mixing the reference light pulse having an electric field $E_r(t-\tau)$ delayed in the optical delay step and the measurement target light pulse;

$$E_r(t-\tau)+\alpha E_r(t-\tau) \star E_0(t)$$

a Fourier transform step of inputting the signal light pulse to an imaging spectrum device and outputting a Fourier transform signal expressed by Formula (1); a step of obtaining the intensity and phase of the measurement target light pulse from a signal (frequency resolved optical gate signal) of the second term of the Fourier transform signal; and a step of obtaining the intensity and the phase of the measurement target light pulse from a signal (electro-optical sampling signal) of the third term of the Fourier transform signal.

In the method for measuring the intensity and phase of the light pulse, the method may include a step of shifting a phase obtained from the frequency resolved optical gate signal to a phase obtained from the electro-optical sampling signal.

Since the phase obtained from the frequency resolved optical gate signal is shifted to the phase obtained from the electro-optical sampling signal, the absolute value of the phase can be obtained.

In addition, the nonlinear mixing step may include a 4-optical-wave difference frequency mixing step.

Since the mixed signal light pulse is spectrally split into two polarization components which are crossed with each other, it is possible to simultaneously split and obtain the FROG signal and the EOS signal.

In addition, the nonlinear mixing step may include a 3-optical-wave difference frequency mixing step or a sum frequency mixing step instead of the 4-optical-wave difference frequency mixing step.

Effect of the Invention

By allowing a phase obtained from an FROG signal to be incident with a phase obtained from an EOS signal, an absolute value of the phase is obtained. It is possible to measure the intensity and phase of a light pulse having an arbitrary time duration.

MODE FOR CARRYING OUT THE INVENTION

The principle of an EOS method in the related art is to measure an interference signal between a nonlinear mixing signal of a reference light pulse $E_r(t)$ and a measurement target light pulse $E_0(t)$ and the reference light pulse $E_r(t)$ by sweeping a delay time between the reference light pulse $E_r(t)$ and the measurement target light pulse $E_0(t)$. In the case where the nonlinear interaction is (3-optical-wave) sum frequency mixing, the signal measured by the EOS method is expressed as follows.

$$\langle |E_r(t-\tau) + \alpha E_r(t-\tau)E_0(t)|^2 \rangle = \qquad (2)$$
$$\langle |E_r(t-\tau)|^2 \rangle + \langle |\alpha E_r(t-\tau)E_0(t)|^2 \rangle + \langle 2R\{\alpha E_r(t-\tau)E_r*(t-\tau)E_0(t)\}\rangle$$

Herein, < > denotes an average with respect to a time, and a denotes a coefficient which is proportional to a nonlinear susceptibility in the (3-optical-wave) sum frequency mixing. R denotes a symbol indicating a real part.

The first term of the right handed side of Formula (2) denotes dc contribution from the reference light pulse. The second term denotes an orthogonal correlation signal intensity of the measurement target light pulse and the reference light pulse. A signal obtained from spectral splitting of the second term corresponds to an orthogonal correlation FROG signal (XFROG) (refer to S. Linden, H. Giessen. J. Kuhl, "XFROG-a new method for amplitude and phase characterization of weak ultrashort pulses," Phys. Status solidi B Vol. 206, pp 119-124 (1998)). The third term is an interference term, that is, an EOS signal. If the $E_r(t-\tau) E_r^*(t-\tau)=I_r(t-\tau)$ is set as a delta function, the third term becomes $E_o(\tau)$ which provides all information on an electric field of the measurement target light pulse. If not, the third term is spectrally filtered through Fourier transform of the $I_r(t)$.

If the XFROG and the EOS, that is, the second and third terms of the right handed side of the Formula (2) can be simultaneously measured, an absolute value of CEP obtained by EOS may be used to determine of the CEP of a pulse analyzed by the XFROG.

Figure 1:
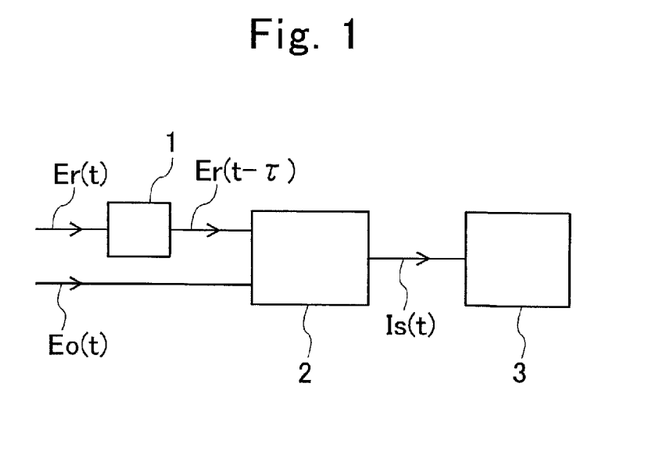
FIG. 1 is a block diagram illustrating an apparatus for measuring the intensity and phase of a light pulse.

A block diagram of an apparatus for measuring the intensity and phase of an light pulse according to the embodiment is illustrated in FIG. 1. The reference light pulse $E_r(t)$ is delayed by τ through an optical delay means 1, and the measurement target pulse $E_0(t)$ and the reference light pulse $E_r(t-\tau)$ are nonlinearly mixed through a nonlinear mixing means 2 to become a signal optical pulse intensity $I_s(t)$ expressed by Formula (3).

$$I_s(t)=|E_r(t-\tau)+\alpha E_r(t-\tau)\star E_0(t)|^2 \quad (3)$$

The signal light pulse intensity $I_s(t)$ is input to an imaging spectrum device 3, so that a Fourier transform signal expressed by Formula (1) may be obtained.

The second term of Formula (1) corresponds to the second term (XFROG) of the right handed side of Formula (2), and the third term of Formula (1) corresponds to the third term (EOS) of the right handed side of Formula (2). Therefore, the phase obtained from the second term of the right handed side of Formula (1) may be corrected by an absolute value obtained from the third term of Formula (1).

Figure 2:
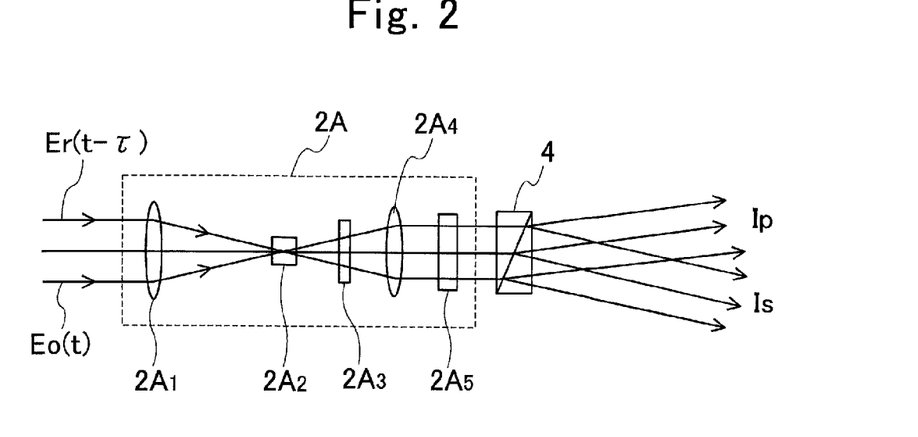
FIG. 2 is a diagram illustrating an optical system of a 4-optical-wave difference frequency mixing means.

As the nonlinear mixing means 2, a 4-optical-wave difference frequency mixing means illustrated in FIG. 2 may be used. When the reference light pulse $E_r(t-\tau)$ and the measurement target light pulse $E_0(t)$ are focused into an argon gas $2A_2$ by a focusing optical system $2A_1$, a 3rd nonlinear optical effect is induced, so that a 4-optical-wave difference frequency mixing (FWM) signal, that is, $E_r^2(t-\tau) E_0^*(t)$ is output through the argon. After the focusing into the argon gas $2A_2$, if a nonlinear optical crystal $2A_3$ is arranged, a second harmonic wave $E_r^2(t-\tau)$ of the reference light pulse $E_r(t-\tau)$ is generated.

Since the polarization of the second harmonic wave $E_r^2(t-\tau)$ is crossed to the polarization of the FWM signal $E_r^2(t-\tau) E_0^*(t)$, both are mixed by a ¼ wavelength plate $2A_5$.

The mixed signal light pulse is split into two signal light beams (p-polarized signal light beam and s-polarized signal light beam) by a Wollaston prism 4. The intensities of the two signal light beams (p-polarized signal light intensity $I_p$ and s-polarized signal light intensity $I_s$) are expressed as follows.

[Mathematical Formula 1]

$$I_p=|E_r^2(t-\tau)|^2+|\alpha E_r^2(t-\tau)E_0^*(t)|^2-2\Re* \{i\alpha E_r^2(t-\tau)E_r^{*2}(t-\tau)E_0(t)\} \quad (4)$$

[Mathematical Formula 2]

$$I_s=|E_r^2(t-\tau)|^2+|\alpha E_r^2(t-\tau)E_0^*(t)|^2+2\Re* \{i\alpha E_r^2(t-\tau)E_r^{*2}(t-\tau)E_0(t)\} \quad (5)$$

By comparing Formula (3) with Formulas (4) and (5), it can be understood that, in case of 4-optical-wave difference frequency mixing, the operator "★" of the nonlinear mixing is a symbol of the operation of allowing Formula (3) to become Formulas (4) and (5).

The two signal light beams are spectrally split by the imaging spectrum device 3, and Fourier transform is performed, so that the spectral intensity and the spectral phase of the measurement target light pulse $E_0(t)$ may be obtained.

Figure 3:
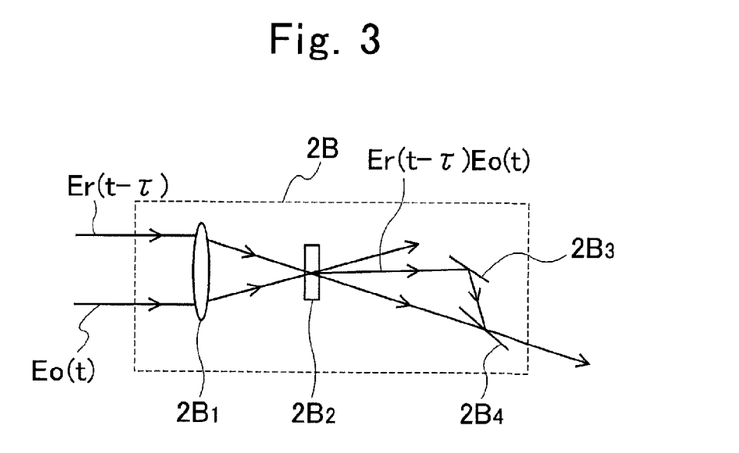
FIG. 3 is a diagram illustrating an optical system of a nonlinear mixing means for allowing a second harmonic wave of a reference light pulse and a measurement target light pulse to interfere with each other.

As illustrated in FIG. 3, the nonlinear mixing means 2 may be set as the nonlinear mixing means 2B for allowing a sum frequency mixing light $E_r(t-\tau) E_0(t)$ of the reference light pulse $E_r(t-\tau)$ and the measurement target light pulse $E_0(t)$ and the reference light pulse $E_r(t-\tau)$ to interfere with each other. When the measurement target light pulse $E_0(t)$ and the reference light pulse $E_r(t-\tau)$ are focused into a nonlinear optical crystal $2B_2$ through lens $2B_1$, a sum frequency mixing light $E_r(t-\tau) E_0(t)$ of the reference light pulse $E_r(t-\tau)$ and the measurement target light pulse $E_0(t)$ is output in the direction of the optical axis. The sum frequency mixing light $E_r(t-\tau) E_0(t)$ is bent by a mirror $2B_3$ to be combined with the reference light pulse $E_r(t-\tau)$ by a combiner $2B_4$. As a result, the two light beams interfere with each other, so that an interference signal light expressed by Formula (2) is output.

Example

Figure 4:
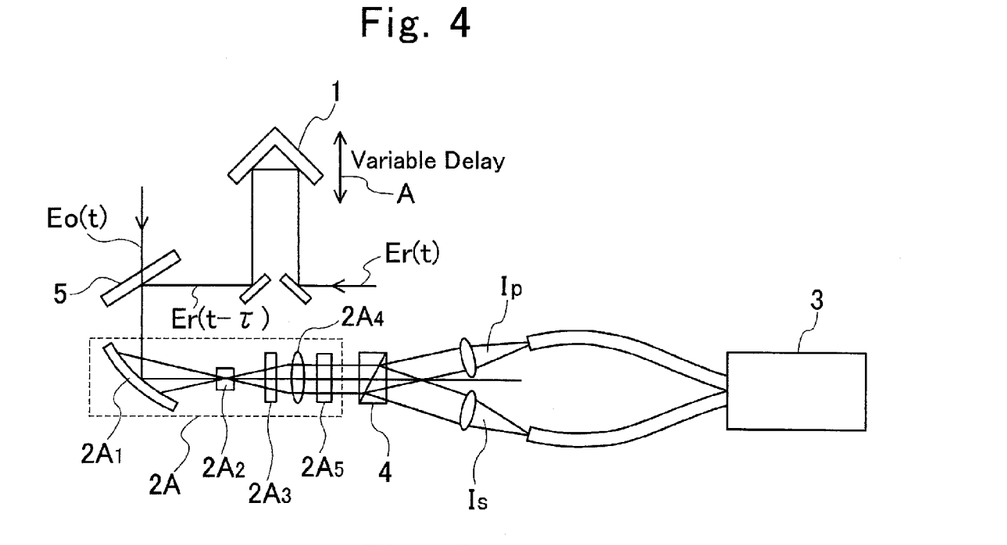
FIG. 4 is a schematic diagram illustrating an apparatus for measuring the intensity and phase of a light pulse according to an example.

An apparatus for measuring the spectral intensity and spectral phase of a light pulse according to one example is schematically illustrated in FIG. 4. The same components as those of the device according to the embodiment are denoted by the same reference numerals, and the description thereof is omitted.

1 denotes a delay time control means for controlling a delay time τ of the reference light pulse $E_r(t)$. By moving a corner mirror in the direction of an arrow A by a servo motor or the like (not shown), an optical path length is changed, so that the delay time τ may be controlled.

5 denotes a perforated mirror of combining the measurement target light pulse $E_0(t)$ and the reference light pulse $E_r(t-\tau)$. $2A_1$ denotes an off-axis parabolic mirror having a focal length of 150 mm. $2A_3$ denotes a BBO crystal (β-BaB$_2$O$_4$, Type 1, θ=29°) having a thickness of 50 μm.

A quasi single cycle pulse of which phase is stabilized is generated from the second harmonic wave of a basic wave of the output of a Ti sapphire amplifier by using 4-optical-wave mixing through filamentation in argon. The generated midinfrared pulse (pulse width: 12 fs, pulse energy: 250 nJ, and wavelength: ~5 μm) was set as the measurement target light pulse $E_0(t)$.

On the other hand, a small amount (pulse width: 25 fs, pulse energy: 2 μJ, and wavelength: 0.8 μm) of a basic wave pulse which is used as a basis for generating the measurement target light pulse $E_0(t)$ was set as the reference light pulse $E_r(t)$.

A measurement target light pulse ($E_0(t)$, 250 nJ, 12 fs) and a basic wave pulse ($E_r(t-\tau)$, 2 μJ, 25 fs) having a delay time τ were combined by a perforated mirror 5. The combined beam was focused into argon $2A_2$ by a parabolic mirror $2A_1$, so that a 4-optical-wave difference frequency mixing (FWM) signal $E_r^2(t-\tau) E_0^*(t)$ was generated.

On the other hand, since the reference light pulse $E_r(t-\tau)$ which is the basic wave pulse is input to a BBO crystal $2A_3$, a second harmonic wave $E_r^2(t-\tau)$ of the basic wave pulse is generated.

Since the polarization of the second harmonic wave $E_r^2(t-\tau)$ and the polarization of the FWM signal $E_r^2(t-\tau) E_0^*(t)$ are crossed with each other, both are mixed by the ¼ wavelength plate $2A_5$ to become a signal light pulse expressed by Formula (2).

The mixed signal light pulse is split into the intensities (p-polarized signal light intensity $I_p$ and s-polarized signal light intensity $I_s$) of the two signal light beams expressed by Formulas (4) and (5) by the Wollaston prism 4. In addition, the Wollaston prism 4 may be configured with a Rochon prism.

The two signal light beams are input to the two-channel imaging spectrum device 3, then a Fourier transform (spectrum) signal expressed by Formula (1) may be obtained. In this example, Formula (1) becomes the spectrum signals $SS_1$ and $SS_2$ expressed as follows.

[Mathematical Formula 3]

$$SS_1 = |\mathcal{F}[E_r^2(t-\tau)]|^2 + |\mathcal{F}[\alpha E_r^2(t-\tau) E_0^*(t)]|^2 - 2\Re\{i\alpha\mathcal{F}[E_r^2(t-\tau)]\cdot(\mathcal{F}[E_r^2(t-\tau)E_0^*(t)])^*\} \quad (6)$$

[Mathematical Formula 4]

$$SS_2 = |\mathcal{F}[E_r^2(t-\tau)]|^2 + |\mathcal{F}[\alpha E_r^2(t-\tau) E_0^*(t)]|^2 + 2\Re\{i\alpha\mathcal{F}[E_r^2(t-\tau)]\cdot(\mathcal{F}[E_r^2(t-\tau)E_0^*(t)])^*\} \quad (7)$$

The first term as a background is removed from the two spectrum signals $SS_1$ and $SS_2$ and the two spectrum signals $SS_1$ and $SS_2$ are added to each other, then the second term remains to become an XFROG signal. If a difference between the two spectrum signals $SS_1$ and $SS_2$ is taken, the third term remains to become an EOS signal.

Figure 5:
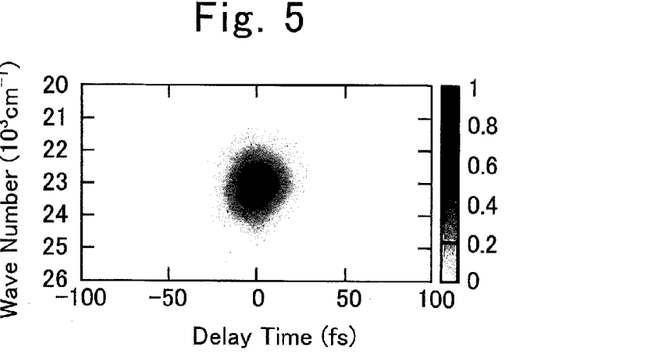
FIG. 5 is a diagram illustrating spectral display of an XFROG signal obtained by adding Formula (7) to Formula (6).
Figure 6:
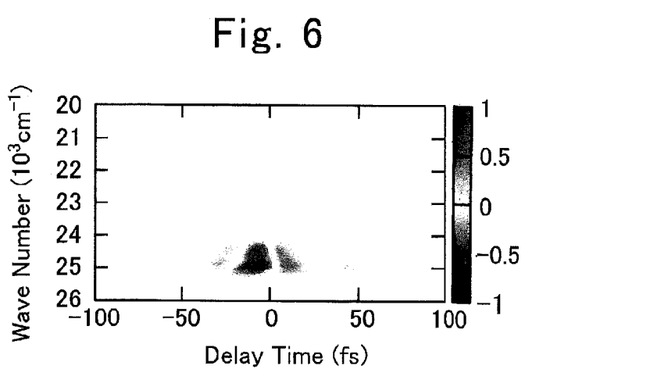
FIG. 6 is a diagram illustrating spectral display of an EOS signal obtained by subtracting Formula (7) from Formula (6).

FIG. 5 is spectral display of the XFROG signal obtained by addition, and FIG. 6 is spectral display of the EOS signal obtained by subtraction.

Figure 7:
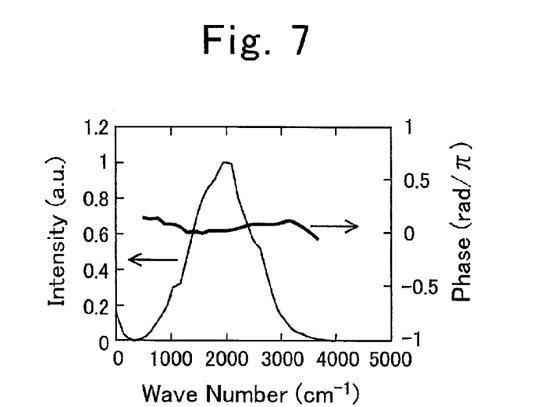
FIG. 7 is a phase spectrum (spectral intensity and spectral phase) in the entire frequency range obtained from spectrum data of FIG. 5 by using an XFROG signal recovering algorithm.

FIG. 7 is a phase spectrum (spectral intensity and spectral phase) in the entire frequency range obtained from the spectrum data of FIG. 5 by using an XFROG signal recovering algorithm (Femto Software Inc., USA).

Figure 8:
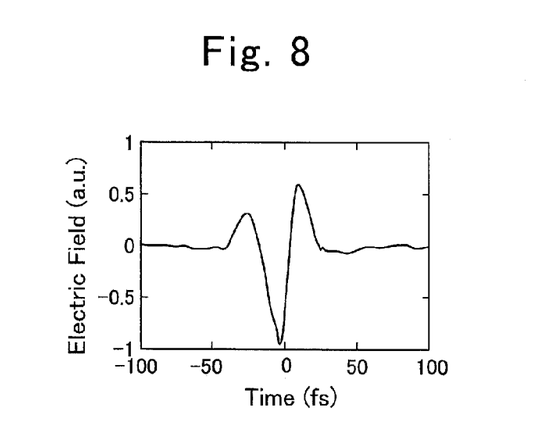
FIG. 8 is a time change (electric field amplitude time waveform) of a phase at a low frequency obtained by integrating spectrum data of FIG. 6 with respect to a wavelength.

FIG. 8 is a time change (electric field amplitude time waveform) of a phase at a low frequency obtained by integrating the spectrum data of FIG. 6 with respect to a wavelength.

Figure 9:
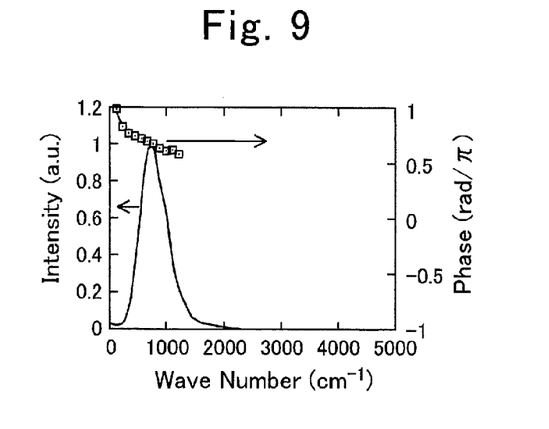
FIG. 9 is a phase spectrum (spectral intensity and spectral phase) at a low frequency obtained by performing Fourier transform on the time change of FIG. 8.

FIG. 9 is a phase spectrum (spectral intensity and spectral phase) at a low frequency obtained by performing Fourier transform on the time change of FIG. 8.

Figure 10A:
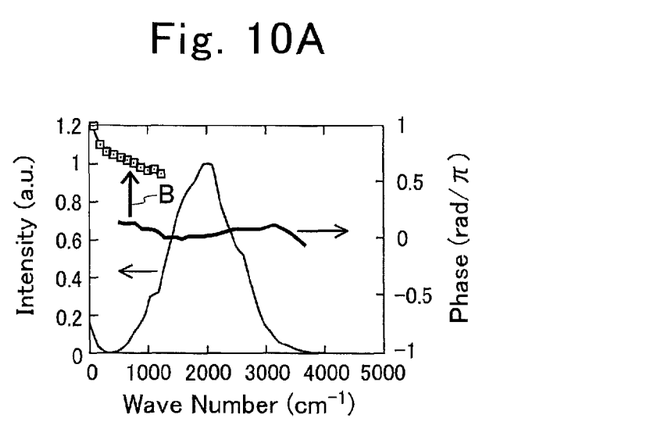
FIG. 10A is a diagram obtained by overlapping the phase spectrum illustrated in FIG. 7 with the spectral phase (□) of FIG. 9.

FIG. 10A is a diagram illustrating obtained by overlapping the phase spectrum illustrated in FIG. 7 with the spectral phase (□) of FIG. 9. As illustrated in FIG. 10A, if the phase spectrum indicated by a solid line is parallel shifted in the direction of the arrow B so as to be coincident with the phase spectrum indicated by □ as illustrated in FIG. 10B, the phase (spectral phase of FIG. 10B) becomes the spectral phase of the measurement target optical pulse which is to be obtained.

Figure 10B:
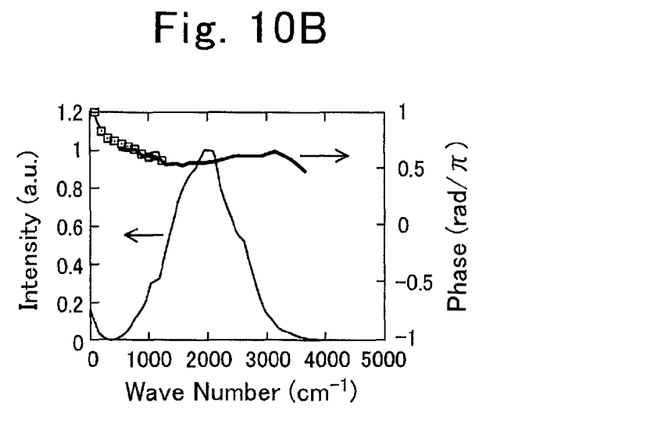
FIG. 10B is a diagram which is coincident with spectral phase spectrum obtained by performing parallel shifting on a phase spectrum indicated by a solid line in FIG. 10A in the direction of an arrow B.
Figure 11:
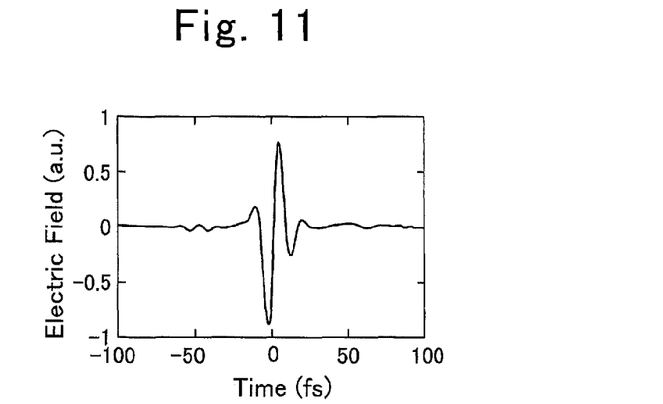
FIG. 11 is an electric field amplitude time waveform of a measurement target optical pulse obtaining inverse Fourier transform on a phase spectrum of FIG. 10B.

An electric field amplitude time waveform of a measurement target light pulse illustrated in FIG. 11 is obtained by performing inverse Fourier transform on the phase transform of FIG. 10B.

DESCRIPTION OF REFERENCE NUMERALS

1 Optical delay means
2, 2A, 2B Nonlinear mixing means
3 Imaging spectrum device

The invention claimed is:

1. An apparatus for measuring spectral intensity and an absolute value of spectral phase of a light pulse from a signal of a second term of a Fourier transform signal representing frequency resolved optical gate signal and a signal of a third term of said Fourier transform signal representing electro-optical sampling signal, said apparatus comprising:

a mirror for changing a time delay $\tau$ between a measurement target light pulse having an electric field $E_0(t)$ changing with a time t and a reference light pulse having an electric field $E_r(t)$;

a nonlinear mixer for generating a signal light pulse expressed by a Formula $E_r(t-\tau) + \alpha E(t-\tau) \star E_0(t)$, an operator $\star$ representing general nonlinear mixing, and $\alpha$ representing a coefficient that is proportional to a nonlinear susceptibility in the nonlinear mixing, by nonlinearly mixing said reference light pulse having an electric field $E_r(t-\tau)$ delayed by said mirror and said measurement target light pulse; and a spectrometer for spectrally resolving said signal light pulse and outputting said Fourier transform signal, said Fourier transform signal expressed by a Formula $|F[E_r(t-\tau)]|^2 + |\alpha F[E_r(t-\tau) \star E_0(t)]|^2 + 2R\{\alpha F[E_r(t-\tau)]^* \cdot F[E_r(t-\tau) \star E_0(t)]\}$, F representing a symbol indicating Fourier transform, * representing a complex conjugate, and R representing a symbol indicating a real part.

2. The apparatus according to claim 1 wherein said nonlinear mixer includes a 4-optical-wave difference frequency mixer, a 3-optical-wave difference frequency mixer, or a sum frequency mixer.

3. The apparatus according to claim 2, wherein said 4-optical-wave difference frequency mixer is configured by arranging a nonlinear optical gas and a nonlinear optical crystal in cascade.

4. The apparatus according to claim 2, wherein said sum frequency mixer includes a combiner for combining said sum frequency mixing light and said reference light pulse.

5. The apparatus according to claim 1, further comprising:

a combiner combining said reference light pulse having an electric field $Er(t-\tau)$ delayed by said mirror and said measurement target light pulse, and a polarizing prism disposed between said nonlinear mixer and said spectrometer, wherein:

said nonlinear mixer comprises a lens converging said reference light pulse and said measurement target light pulse, a nonlinear gas disposed in a field of light collection of said lens, a collimating lens collimating a 4-optical-wave difference frequency mixing signal light generated from said nonlinear gas, a nonlinear crystal disposed between said nonlinear gas and said collimating lens, and a wave plate disposed behind said collimating lens, and said spectrometer is a 2 channel spectrometer.

6. A method for measuring spectral intensity and an absolute value of spectral phase of a light pulse comprising:

changing a time delay $\tau$ between a measurement target light pulse having an electric field $E_0(t)$ changing with a time t and a reference light pulse having an electric field $E_r(t)$;

generating a signal light pulse expressed by a Formula $E_r(t-\tau) + \alpha E_r(t-\tau) \star E_0(t)$, an operator $\star$ representing general nonlinear mixing, and $\alpha$ representing a coefficient that is proportional to a nonlinear susceptibility in the nonlinear mixing by nonlinearly mixing said reference light pulse having an electric field $E_r(t-\tau)$ delayed in said changing of the time delay and said measurement target optical pulse;

inputting said signal light pulse to an imaging spectrum device and outputting a Fourier transform signal expressed by a Formula $|F[E_r(t-\tau)]|^2 + |\alpha F[E_r(t-\tau) \star E_0(t)]|^2 + 2R\{\alpha F[E_r(t-\tau)]^* \cdot F[E_r(t-\tau) \star E_0(t)]\}$, F representing a symbol indicating Fourier transform, * representing a complex conjugate, and R representing a symbol indicating a real part;

obtaining the intensity and phase of said measurement target light pulse from a signal of a second term of said Fourier transform signal representing frequency resolved optical gate signal; and obtaining the intensity and phase of said measurement target light pulse from a signal of a third term of said Fourier transform signal representing electro-optical sampling signal.

7. A method according to claim 6, further including the step of shifting the phase obtained from said frequency resolved optical gate signal to the phase obtained from said electro-optical sampling signal.

8. A method according to claim 6, wherein said generating the signal light pulse includes a step of 4-optical-wave difference frequency mixing, a 3-optical-wave difference frequency mixing, or a sum frequency mixing.

* * * * *